US006901748B2

(12) United States Patent
Gomulka

(10) Patent No.: US 6,901,748 B2
(45) Date of Patent: Jun. 7, 2005

(54) HEATER SYSTEM FOR DIESEL ENGINES HAVING A SELECTIVE CATALYTIC REDUCTION SYSTEM

(75) Inventor: Ted Gene Gomulka, Livonia, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 10/437,541

(22) Filed: May 14, 2003

(65) Prior Publication Data

US 2004/0226285 A1 Nov. 18, 2004

(51) Int. Cl.$^7$ ................................................ F01N 3/00

(52) U.S. Cl. ............................ 60/286; 60/300; 60/303; 423/239.1

(58) Field of Search ......................... 60/274, 286, 299, 60/300, 301, 303; 423/212, 235, 239.1

(56) References Cited

U.S. PATENT DOCUMENTS

| | | | |
|---|---|---|---|
| 4,480,595 A | * | 11/1984 | Hobby et al. ............... 123/1 A |
| 5,809,775 A | * | 9/1998 | Tarabulski et al. ............ 60/274 |
| 5,884,475 A | | 3/1999 | Hofmann et al. |
| 5,968,464 A | * | 10/1999 | Peter-Hoblyn et al. ..... 423/235 |
| 6,063,350 A | * | 5/2000 | Tarabulski et al. ........ 423/239.1 |
| 6,209,313 B1 | | 4/2001 | Wissler et al. |
| 6,387,336 B2 | * | 5/2002 | Marko et al. ............... 423/212 |
| 6,519,935 B2 | | 2/2003 | Weigl |
| 6,688,263 B1 | * | 2/2004 | Yamamoto et al. ...... 123/41.57 |

* cited by examiner

*Primary Examiner*—Binh Q. Tran
(74) *Attorney, Agent, or Firm*—Reising, Ethington, Barnes, Kisselle, P.C.

(57) ABSTRACT

A diesel engine (10) having a selective catalytic reduction system with a urea tank (12). A heater element (26) is mounted in the urea tank and another heating element (34) is mounted in the engine (10) for cold weather starts. Both heating elements (24) and (26) are connected to a common cord (18) which has at its distal end a common electrical plug (16) for plugging into an electrical receptacle.

8 Claims, 1 Drawing Sheet

HEATER SYSTEM FOR DIESEL ENGINES HAVING A SELECTIVE CATALYTIC REDUCTION SYSTEM

TECHNICAL FIELD

The field of this invention relates to a selective catalytic reduction system for diesel engines using a urea solution and more particularly to a heater for the diesel engine block and urea tank.

BACKGROUND OF THE DISCLOSURE

Diesel engines have long been used in automotive application, particularly for larger truck applications. Because of the great popularity of diesel engines and extensive use with trucks on the highways and roads around the world, there have been tremendous efforts and great advances to reduce many air polluting emissions entering the environment as much as practical.

Of the various emissions which have been identified for possible reduction, oxides of nitrogen commonly referred to as NOx emissions have been regulated by the United States Federal government. It has been known that selective catalytic reduction (SCR) is a very effective means to provide NOx reduction. Selective catalytic reduction has been known for stationary power applications. Selective catalytic reduction uses an aqueous urea solution as a reductant introduced into the exhaust system upstream of the catalytic converter.

One of the hurdles in using such an aqueous urea solution is that it is subject to freezing. For example, a 32% urea solution may freeze at temperatures below −11° C. This relatively modest cold temperature is often encountered in colder climates during the winter season. If the urea solution freezes, it will not function in its desired manner as a reductant nor will it freely flow to the reduction site where it can be warmed by the hot exhaust emissions. Besides running with elevated emissions, an engine may run afoul of certain regulations without the liquid urea.

It is desirable to apply such a SCR system to automotive applications. Such SCR systems work fine in warm climates or while the diesel engine is running and the heat of the engine and exhaust provides for sufficient heat to keep the reducing solution in liquid state and freely flowing to the site of reduction. Maintaining the solution above freezing while the engine is running is provided by using warmed coolant of the engine to heat the reservoir and the urea supply lines. It is also know to apply an electric heater fed from the engine battery.

While these solutions are acceptable during operation of the diesel engine when the coolant is heated by the engine and the battery is being recharged by the alternator, they are not adequate for long storage or overnight shut down of the diesel engine in cold weather.

Previous attempts at providing liquid urea after long shut down and subsequent cold start of the diesel was to provide a separate small starting tank where the small amount of urea can be thawed during the initial start up of the engine or preheated by an electrical heater. This starting volume is used during the time it takes the diesel engine to warm up and use its warmed coolant to warm and thaw the main tank of urea solution. Such a remedy is expensive requiring an extra tank, and relies on the premise that the amount of starting urea solution is sufficient while the main tank is warmed and thawed. This premise may not be justified during extreme cold weather starts which can result in a phase of engine operation when there is no thawed or liquid reductant available.

It is also well known that diesel engines are harder to start than regular gasoline engines in cold weather. Accordingly, it is common to provide an auxiliary engine block electric heater to a diesel engine for keeping the engine warm when it is shut off for an extended period of time such as overnight in cold climates. Such heaters are commonly available and can be installed as original equipment or can be provided as an aftermarket option. A typical heater includes an electric heating element installed in the water jacket of the engine. A power supply cord plugs into an available 120 volt AC electric outlet. These heaters are widely used because they effectively warm the engine sufficiently to provide a reliable cold start. Truck drivers are used to plugging these heaters in during the winter season for a better cold weather start.

What is needed is a modified auxiliary engine block heater that also incorporates a heating element mounted in the urea tank such that when the heating element of the diesel engine is on, the urea tank is also automatically warmed to keep the solution from freezing. What is also needed is a heater system for a SCR system that does not entail any additional procedures other than those with which a truck operator is already familiar.

SUMMARY OF THE DISCLOSURE

In accordance with one aspect of the invention, an automotive diesel engine includes an engine block with a coolant system and a selective catalytic reduction system operably connected to the exhaust system for reducing air pollutant emissions. The catalytic reduction system includes a urea tank for storing and delivering urea solution to the exhaust system. A first heater element is mounted in the coolant system and a second heater element is mounted in the urea tank that preferably stores an aqueous solution of approximately 32.5% urea. It is desirable that the first heating element is mounted in the water jacket of the coolant system.

Both heater elements are operably connected to a common power cord which has its distal end connected to a common plug i.e. an electric plug for plugging into electrical outlet.

In accordance with another aspect of the invention, a heater system for a diesel engine has a selective catalytic reduction system for treating exhaust emissions of the engine. The heater system includes a urea tank for storing an aqueous urea solution used as a reductant for the treatment of the exhaust emission. The heating system includes a first heating element for heating of the coolant of the engine and a second heating element for heating of the urea solution within the urea tank. Both heating elements are operably connected to a common electric plug for plugging into an electrical outlet preferably through a common power cord.

It is preferable that in the heater system for a diesel engine, the first heating element is mounted in the water jacket of the coolant system and the second heating element is mounted in the urea tank.

In accordance with another aspect of the invention, a heater assembly for a diesel engine includes a first heating element for mounting in a coolant system of a diesel engine and a second heating element for mounting in a urea tank of a selective catalytic reduction system of a diesel engine. It is preferable that the first and second heater elements are operably connected to a common electric plug preferably via a common power cord.

BRIEF DESCRIPTION OF THE DRAWINGS

Reference now is made to the accompanying drawings in which.

DETAILED DESCRIPTION OF THE PREFERRED EMBODIMENT

Figure 1:
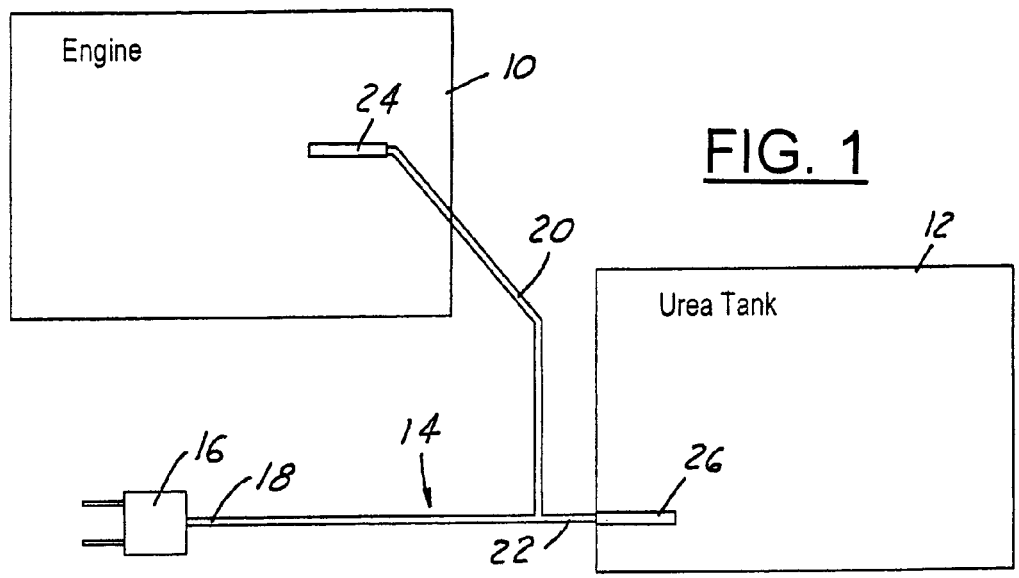
FIG. 1 is a schematic of an engine incorporating a urea tank for selective catalytic reduction and both being connected to a respective heater element.

Referring now to FIG. 1, a diesel engine 10 for an automotive vehicle such as a truck is schematically illustrated along with a urea tank 12. The urea tank conventionally has a supply line that leads to the engine exhaust system (both not shown). An electrical power cord 14 has a plug 16 attached to a common distal end 18.

The cord 14 splits into two branches 20 and 22. Branch 20 is connected to a heater element 24 that is mounted into the engine 10. The branch 22 is connected to heater element 26 that is mounted within the urea tank 12.

Figure 2:
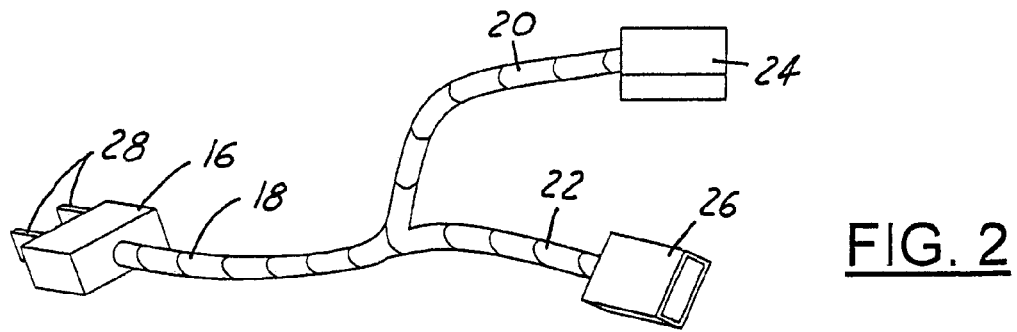
FIG. 2 is perspective view of the heater elements connected to a common power cord and plug as shown in FIG. 1.

As shown in FIG. 2, the branches 20 and 22 join in a Y joint to the common distal end 18. The plug 16 has conventional electrical prongs 28 that are constructed to be plugged into an electrical outlet such as a common place 120 volt AC receptacle.

Figure 3:
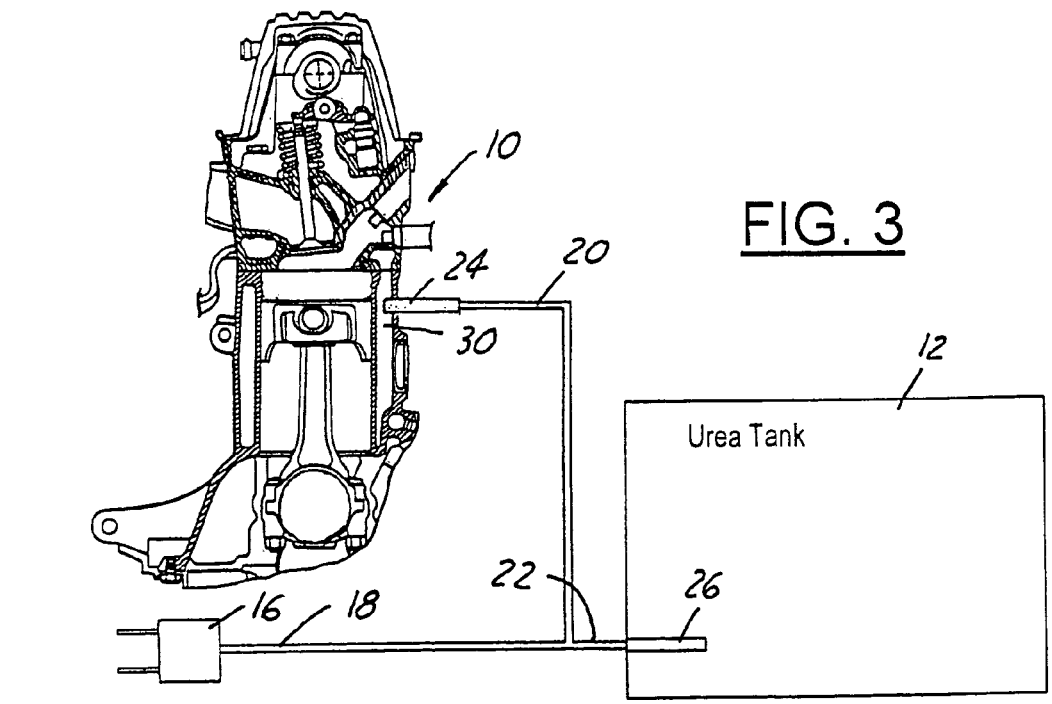
FIG. 3 is a view illustrating the first heating element mounted to the water jacket of the diesel engine.

The heater element 24 is desirably mounted in the water jacket 30 of the diesel engine 10 in a conventional fashion as shown in FIG. 3.

In this manner, heating of the urea tank is assured when the operator plugs in the engine coolant heater 24 for anticipated cold weather starts. The truck operator is not burdened with a separate or additional step.

The truck operator only repeats the common well instituted practice of plugging in plug 16 for warming the engine 10 for an upcoming cold weather start. As such, when a new SCR environmental control system is installed in the vehicle, the truck operator need not change his operating habits in preparing his truck for a cold weather start.

The truck operator's same procedure for cold weather starts, assures that the environment control system retains its urea tank at an acceptable operating temperature above the thaw point for aqueous urea. Whenever the operator plugs in the heater element 24 for cold weather starts with plug 16, the operator is assured that heater element 26 is also operably plugged in to heat the urea tank contents to a temperature above its thaw temperature to retain the reductant in a liquid state.

Variations and modifications are possible without departing from the scope and spirit of the present invention as defined by the appended claims.

What is claimed is:

1. An automotive diesel engine comprising;
an engine block with a coolant system;
a selective catalytic reduction system operably connected to the exhaust system for reducing air pollutant emissions that includes a urea tank for storing and circulating urea solution;
a first heater element mounted in the coolant system and a second heater element mounted in the urea tank; and
both heater elements operably connected to a common electrical plug for simultaneous connection to a power source.

2. An automotive diesel engine as defined in claim 1 wherein the first heating element is mounted in the water jacket of the coolant system.

3. An automotive diesel engine as defined in claim 1 wherein the urea tank stores a solution that is approximately 32.5% urea solution.

4. An automotive diesel engine comprising;
an engine block with a coolant system;
a selective catalytic reduction system operably connected to the exhaust system for reducing air pollutant emissions that includes a urea tank for storing and circulating urea solution;
a first heater element mounted in the coolant system and a second heater element mounted in the urea tank;
both heater elements operably connected to a common electrical plug wherein the common electrical plug is connected to a common power cord which is attached to a first and second branches; and
said first branch is connected to the first heater element and said second branch is connected to said second heater element.

5. A heater system for a diesel engine having a selective catalytic reduction system for treating exhaust emissions of the engine comprising:
a urea tank for storing a urea solution used a reductant for the treatment of the exhaust emission;
a heating system including a first heating element for operable heating of the coolant of the engine and a second heating element for operable heating of the urea solution within the urea tank; and
both heating elements operably connected to a common electrical plug for simultaneous connection to a power source.

6. A heater system for a diesel engine as defined in claim 5 wherein the first heating element is mounted in the water jacket of the coolant system and the second heating element is mounted in the urea tank.

7. A heater system for a diesel engine having a selective catalytic reduction system for treating exhaust emissions of the engine comprising:
a urea tank for storing a urea solution used a reductant for the treatment of the exhaust emission;
a heating system including a first heating element for operable heating of the coolant of the engine and a second heating element for operable heating of the urea solution within the urea tank;
both heating elements operably connected to a common electrical plug wherein the common electrical plug is connected to a common power cord which is attached to a first and second branches; and
said first branch is connected to the first heater element and said second branch is connected to said second heater element.

8. A heater assembly for a diesel engine comprising;
a first heater element for mounting in a coolant system of a diesel engine;
a second heater element for mounting in a urea tank of a selective catalytic reduction system of a diesel engine; and
said first and second heater elements being operably connected to a common power cord which has its distal end being connected to a common electric plug for simultaneous connection of the first and second heater elements to a power source through said common electric plug.

* * * * *

UNITED STATES PATENT AND TRADEMARK OFFICE
CERTIFICATE OF CORRECTION

PATENT NO. : 6,901,748 B2
DATED : June 7, 2005
INVENTOR(S) : Ted Gene Gomulka

It is certified that error appears in the above-identified patent and that said Letters Patent is hereby corrected as shown below:

Title page,
Item [57], ABSTRACT,
Line 3, after "another heating element", delete "34", insert -- 24 --.

Column 1,
Line 50, after "It is also", delete "know", insert -- known --.

Column 3,
Line 8, after "Figure 2 is", insert -- a --.

Column 4,
Lines 27 and 42, after "a urea solution used", insert -- as --.

Signed and Sealed this

Twenty-third Day of August, 2005

JON W. DUDAS
*Director of the United States Patent and Trademark Office*